United States Patent
Kubo et al.

(10) Patent No.: US 11,631,098 B2
(45) Date of Patent: Apr. 18, 2023

(54) CONTROL APPARATUS, SYSTEM, NON-TRANSITORY COMPUTER READABLE MEDIUM, AND DISCOUNT DETERMINATION METHOD

(71) Applicant: Toyota Jidosha Kabushiki Kaisha, Toyota (JP)

(72) Inventors: Daiki Kubo, Toyota (JP); Taiki Yamashita, Toyota (JP); Eduard Vandersmitte, McKinney, TX (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/409,074

(22) Filed: Aug. 23, 2021

(65) Prior Publication Data
US 2022/0067770 A1  Mar. 3, 2022

(30) Foreign Application Priority Data
Aug. 25, 2020 (JP) .............................. JP2020-142100

(51) Int. Cl.
G06Q 30/00 (2023.01)
G06Q 30/0208 (2023.01)
G06Q 30/0242 (2023.01)
G05B 19/418 (2006.01)

(52) U.S. Cl.
CPC ..... *G06Q 30/0208* (2013.01); *G06Q 30/0242* (2013.01)

(58) Field of Classification Search
CPC ....................... G06Q 30/0208; G06Q 30/0242
See application file for complete search history.

(56) References Cited

U.S. PATENT DOCUMENTS

| 11,232,301 B2 * | 1/2022 | Cohen ...................... G08G 1/14 |
| 2019/0164355 A1 | 5/2019 | Nakanishi et al. |
| 2019/0266643 A1 * | 8/2019 | Cho ....................... G09F 21/042 |

FOREIGN PATENT DOCUMENTS

JP  2019-096213 A  6/2019

OTHER PUBLICATIONS

"SmartParking: A Secure and Intelligent Parking System". IEEE. 2011 (Year: 2011).*
"New Mobility Markets". IEEE. 2010 (Year: 2010).*

* cited by examiner

*Primary Examiner* — Maria V Vanderhorst
(74) *Attorney, Agent, or Firm* — Dinsmore & Shohl LLP

(57) ABSTRACT

A control apparatus includes a controller configured to identify a position of a vehicle presenting an advertisement to outside of the vehicle, and determine whether to apply a discount to a usage fee for the vehicle according to the identified position.

8 Claims, 7 Drawing Sheets

CONTROL APPARATUS, SYSTEM, NON-TRANSITORY COMPUTER READABLE MEDIUM, AND DISCOUNT DETERMINATION METHOD

CROSS-REFERENCE TO RELATED APPLICATION

This application claims priority to Japanese Patent Application No. 2020-142100, filed on Aug. 25, 2020, the entire contents of which are incorporated herein by reference.

TECHNICAL FIELD

The present disclosure relates to a control apparatus, a system, a program, and a discount determination method.

BACKGROUND

A fee setting server described in Patent Literature (PTL) 1, upon acquiring end-of-use information from a vehicle, requests the vehicle to capture an inner-vehicle image data. The fee setting server, upon acquiring the inner-vehicle image data from the vehicle, identifies the number of occupants from the acquired inner-vehicle image data. In a case in which the number of occupants is large, the fee setting server sets an amount of a usage fee for car sharing lower than a case in which the number of occupants is small.

CITATION LIST

Patent Literature

PTL 1: JP 2019-096213 A

SUMMARY

Trucks displaying advertisements on side displays are known. A vehicle used for car sharing may also display an advertisement. However, depending on the position of the vehicle, the advertisement may not be seen by people and may not be effective in promotion.

It would be helpful to provide an incentive to a user according to the position of a vehicle serving as an advertising medium.

A control apparatus according to the present disclosure includes a controller configured to:

identify a position of a vehicle presenting an advertisement to outside of the vehicle; and determine whether to apply a discount to a usage fee for the vehicle according to the identified position.

A program according to the present disclosure is configured to cause a computer mounted or installed in a vehicle to execute operations, the vehicle presenting an advertisement to outside of the vehicle, the operations including:

transmitting candidate data indicating a candidate parking position of the vehicle to a control apparatus configured to determine whether to apply a discount to a usage fee for the vehicle according to a parking position of the vehicle;

receiving, from the control apparatus, notification data notifying a user whether the discount is to be applied if the vehicle is parked at the position indicated by the transmitted candidate data; and outputting the received notification data.

A discount determination method according to the present disclosure includes:

presenting, by a vehicle, an advertisement to outside of the vehicle;

identifying, by a control apparatus, a position of the vehicle; and determining, by the control apparatus, whether to apply a discount to a usage fee for the vehicle according to the identified position.

According to the present disclosure, an incentive can be provided to a user according to the position of a vehicle serving as an advertising medium.

DETAILED DESCRIPTION

Hereinafter, an embodiment of the present disclosure will be described with reference to the drawings.

In the drawings, the same or corresponding portions are denoted by the same reference numerals. In the descriptions of the present embodiment, detailed descriptions of the same or corresponding portions are omitted or simplified, as appropriate.

Figure 1:
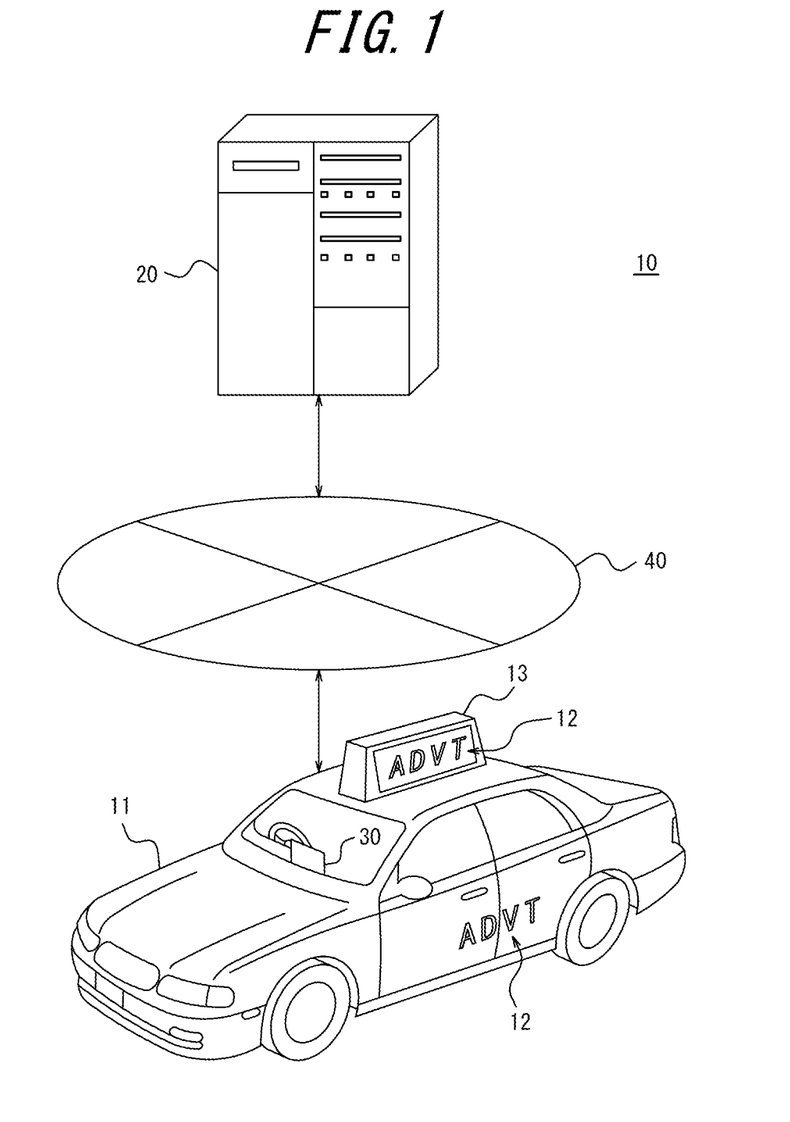
FIG. 1 is a diagram illustrating a configuration of a system according to an embodiment of the present disclosure.

A configuration of a system 10 according to the present embodiment will be described with reference to FIG. 1.

The system 10 according to the present embodiment includes at least one control apparatus 20, and at least one terminal apparatus 30.

The control apparatus 20 is installed in a facility such as a data center. The control apparatus 20 is, for example, a server that belongs to a cloud computing system or another type of computing system.

The terminal apparatus 30 is mounted or installed in a vehicle 11. The terminal apparatus 30 is, for example, an in-vehicle device such as a car navigation device, a mobile device such as a mobile phone, a smartphone, or a tablet, or a PC. The term "PC" is an abbreviation of personal computer.

The vehicle 11 is configured to present an advertisement 12 to the outside of the vehicle 11. In the present embodiment, the advertisement 12 is presented by being displayed on each of the body of the vehicle 11 and a display 13 attached to the vehicle 11. The advertisement 12 displayed on the vehicle body is applied to at least one side of the vehicle 11 by wrapping or painting in the present embodiment, but may be applied to any exposed surface such as the top surface of the vehicle 11. The display 13 is attached to the top surface of the vehicle 11 in the present embodiment, but may be attached to any exposed surface such as a side surface of the vehicle 11. As a variation of the present embodiment, the advertisement 12 may be presented by being displayed only on the body of the vehicle 11, or only on the display 13, or may be presented by being output as audio from a speaker attached to the vehicle 11.

The vehicle 11 is used for car sharing in the present embodiment, but may be used for another paid service such as car rental. The vehicle 11 is, for example, any type of automobile such as a gasoline vehicle, a diesel vehicle, an HV, a PHV, an EV, or an FCV. The term "HV" is an abbreviation of hybrid vehicle. The term "PHV" is an abbreviation of plug-in hybrid vehicle. The term "EV" is an abbreviation of electric vehicle. The term "FCV" is an abbreviation of fuel cell vehicle. The vehicle 11 is driven by a driver in the present embodiment, but the driving may be automated at any level. The automation level is, for example, any one of Level 1 to Level 5 according to the level classification defined by SAE. The name "SAE" is an abbreviation of Society of Automotive Engineers. The vehicle 11 may be a MaaS-dedicated vehicle. The term "MaaS" is an abbreviation of Mobility as a Service.

The control apparatus 20 can communicate with the terminal apparatus 30 via a network 40.

The network 40 includes the Internet, at least one WAN, at least one MAN, or a combination thereof. The term "WAN" is an abbreviation of wide area network. The term "MAN" is an abbreviation of metropolitan area network. The network 40 may include at least one wireless network, at least one optical network, or a combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIG. 1.

In the system 10 according to the present embodiment, the vehicle 11 presents an advertisement 12 to the outside of the vehicle 11. The control apparatus 20 identifies the position of the vehicle 11. The control apparatus 20 determines whether to apply a discount to a usage fee for the vehicle 11 according to the identified position.

According to the present embodiment, an incentive can be provided to a user according to the position of the vehicle 11, which serves as an advertising medium. For example, in a case in which the vehicle 11 is moved to a position where the advertisement 12 can be easily seen by people, an incentive in the form of a discount on the usage fee for the vehicle 11 can be provided to the user, thereby increasing the motivation of the user to move the vehicle 11 to such a position. Alternatively, in a case in which the vehicle 11 is parked at a position where the advertisement 12 can be easily seen by people, an incentive in the form of a discount on the usage fee for the vehicle 11 can be provided to the user, thereby increasing the motivation of the user to park the vehicle 11 at such a position. As a result, it is expected that the advertisement 12 can be more easily seen by people and may be more effective in promotion.

Figure 2:
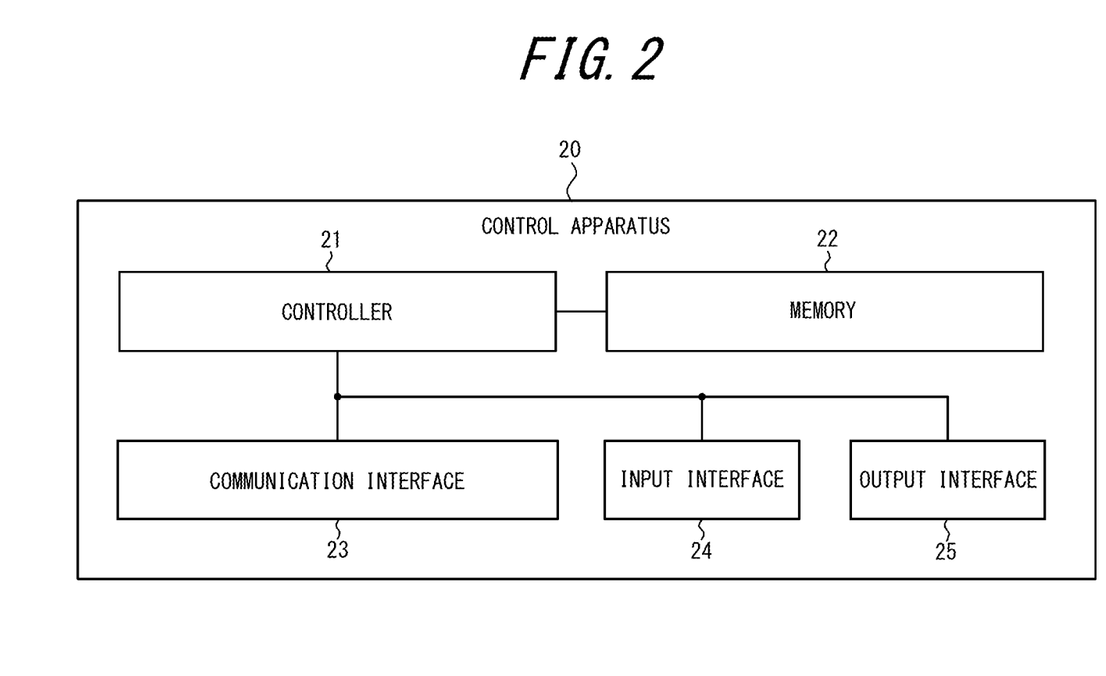
FIG. 2 is a block diagram illustrating a configuration of a control apparatus according to the embodiment of the present disclosure.

A configuration of the control apparatus 20 according to the present embodiment will be described with reference to FIG. 2.

The control apparatus 20 includes a controller 21, a memory 22, a communication interface 23, an input interface 24, and an output interface 25.

The controller 21 includes at least one processor, at least one dedicated circuit, or a combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The dedicated circuit is, for example, an FPGA or an ASIC. The term "FPGA" is an abbreviation of field-programmable gate array. The term "ASIC" is an abbreviation of application specific integrated circuit. The controller 21 executes processes related to operations of the control apparatus 20 while controlling components of the control apparatus 20.

The memory 22 includes at least one semiconductor memory, at least one magnetic memory, at least one optical memory, or a combination of at least two of these. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores data to be used for the operations of the control apparatus 20 and data obtained by the operations of the control apparatus 20.

The communication interface 23 includes at least one interface for communication. The interface for communication is, for example, a LAN interface. The communication interface 23 receives data to be used for the operations of the control apparatus 20, and transmits data obtained by the operations of the control apparatus 20.

The input interface 24 includes at least one interface for input. The interface for input is, for example, a physical key, a capacitive key, a pointing device, a touch screen integrally provided with a display, a microphone, or a camera. The input interface 24 accepts an operation for inputting data to be used for the operations of the control apparatus 20. The input interface 24, instead of being included in the control apparatus 20, may be connected to the control apparatus 20 as an external input device. As the connection method, any technology such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 25 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescence. The output interface 25 outputs data obtained by the operations of the control apparatus 20. The output interface 25, instead of being included in the control apparatus 20, may be connected to the control apparatus 20 as an external output device. As the connection method, any technology such as USB, HDMI®, or Bluetooth® can be used.

The functions of the control apparatus 20 are realized by execution of a control program according to the present embodiment by a processor serving as the controller 21. That is, the functions of the control apparatus 20 are realized by software. The control program causes a computer to execute the operations of the control apparatus 20, thereby causing the computer to function as the control apparatus 20. That is, the computer executes the operations of the control apparatus 20 in accordance with the control program to thereby function as the control apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 20 may be realized by a dedicated circuit serving as the controller 21. That is, some or all of the functions of the control apparatus 20 may be realized by hardware.

Figure 3:
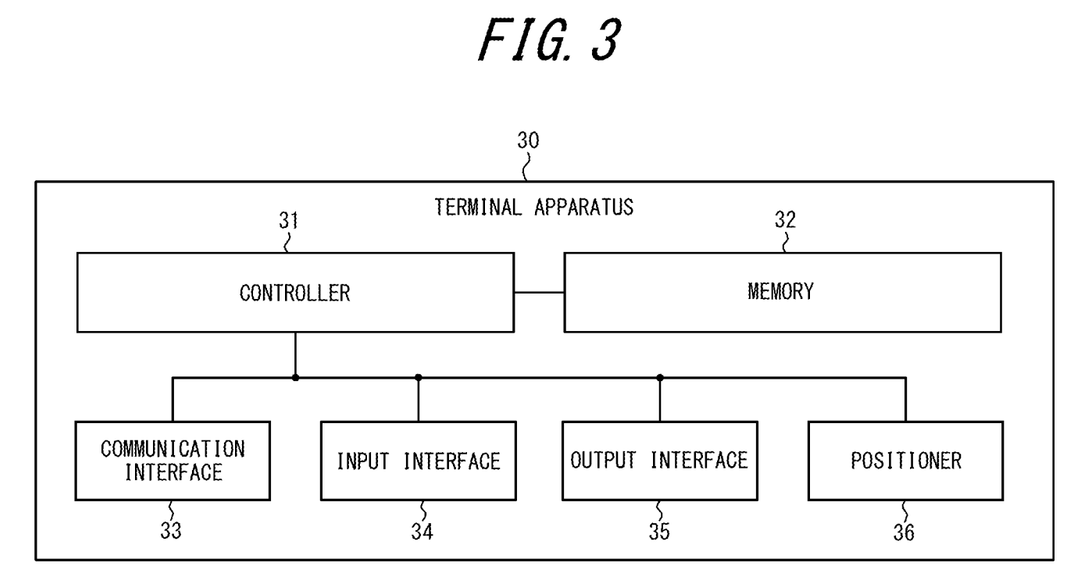
FIG. 3 is a block diagram illustrating a configuration of a terminal apparatus according to the embodiment of the present disclosure.

A configuration of the terminal apparatus 30 according to the present embodiment will be described with reference to FIG. 3.

The terminal apparatus 30 includes a controller 31, a memory 32, a communication interface 33, an input interface 34, an output interface 35, and a positioner 36.

The controller 31 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 31 may include at least one ECU. The term "ECU" is an abbreviation of electronic control unit. The controller 31 executes processes related to operations of the terminal apparatus 30 while controlling components of the terminal apparatus 30.

The memory 32 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores data to be used for the operations of the terminal apparatus 30 and data obtained by the operations of the terminal apparatus 30.

The communication interface 33 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The term "LTE" is an abbreviation of Long Term Evolution. The term "4G" is an abbreviation of 4th generation. The term "5G" is an abbreviation of 5th generation. The communication interface 33 receives data to be used for the operations of the terminal apparatus 30, and transmits data obtained by the operations of the terminal apparatus 30.

The input interface 34 includes at least one interface for input. The interface for input is, for example, a physical key, a capacitive key, a pointing device, a touch screen integrally provided with a display, a microphone, or a camera. The input interface 34 accepts an operation for inputting data to be used for the operations of the terminal apparatus 30. The input interface 34, instead of being included in the terminal apparatus 30, may be connected to the terminal apparatus 30 as an external input device. As the connection method, any technology such as USB, HDMI®, or Bluetooth® can be used.

The output interface 35 includes at least one interface for output. The interface for output is, for example, a display or a speaker. The display is, for example, an LCD or an organic EL display. The output interface 35 outputs data obtained by the operations of the terminal apparatus 30. The output interface 35, instead of being included in the terminal apparatus 30, may be connected to the terminal apparatus 30 as an external output device such as a display audio. As the connection method, any technology such as USB, HDMI®, or Bluetooth® can be used.

The positioner 36 includes at least one GNSS receiver. The term "GNSS" is an abbreviation of global navigation satellite system. GNSS is, for example, GPS, QZSS, GLONASS, or Galileo. The term "GPS" is an abbreviation of Global Positioning System. The term "QZSS" is an abbreviation of Quasi-Zenith Satellite System. QZSS satellites are called quasi-zenith satellites. The term "GLONASS" is an abbreviation of Global Navigation Satellite System. The positioner 36 measures the position of the terminal apparatus 30.

The functions of the terminal apparatus 30 are realized by execution of a terminal program according to the present embodiment by a processor serving as the controller 31. That is, the functions of the terminal apparatus 30 are realized by software. The terminal program causes a computer to execute the operations of the terminal apparatus 30, thereby causing the computer to function as the terminal apparatus 30. That is, the computer executes the operations of the terminal apparatus 30 in accordance with the terminal program to thereby function as the terminal apparatus 30.

Some or all of the functions of the terminal apparatus 30 may be realized by a dedicated circuit serving as the controller 31. That is, some or all of the functions of the terminal apparatus 30 may be realized by hardware.

Figure 4:
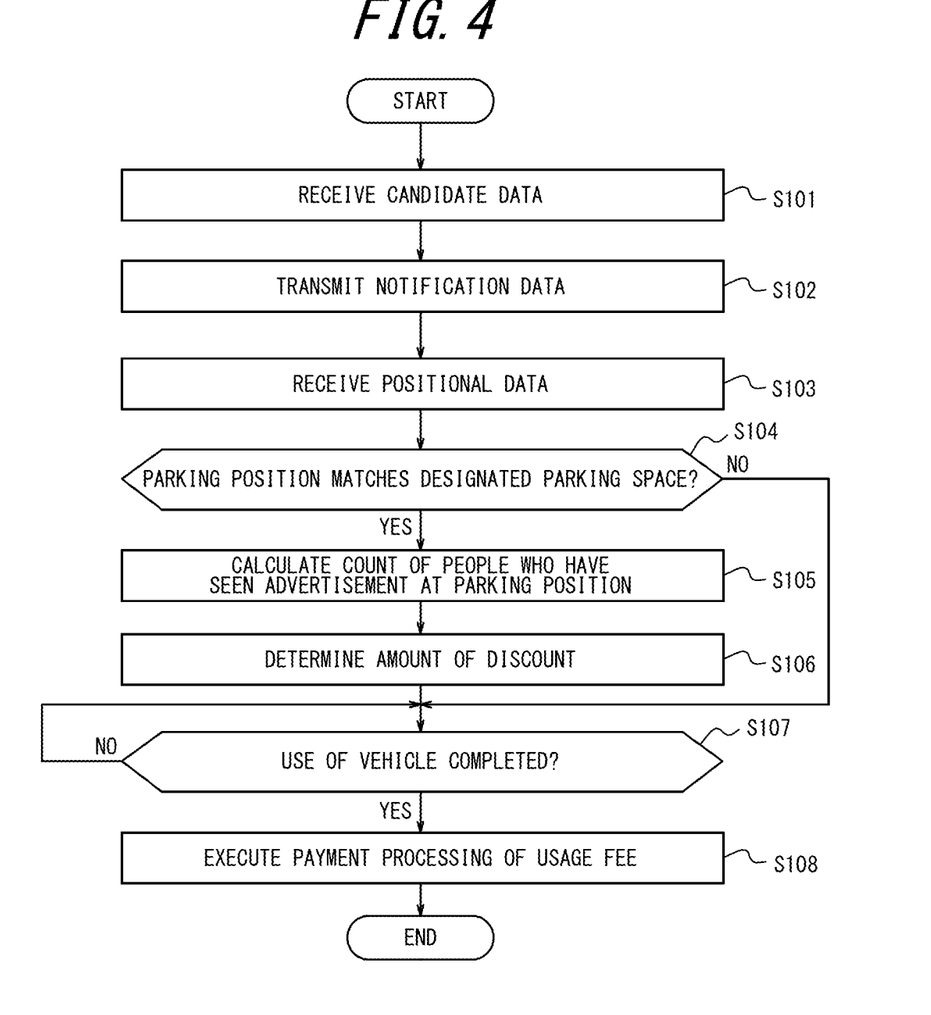
FIG. 4 is a flowchart illustrating operations of the control apparatus according to the embodiment of the present disclosure.
Figure 5:
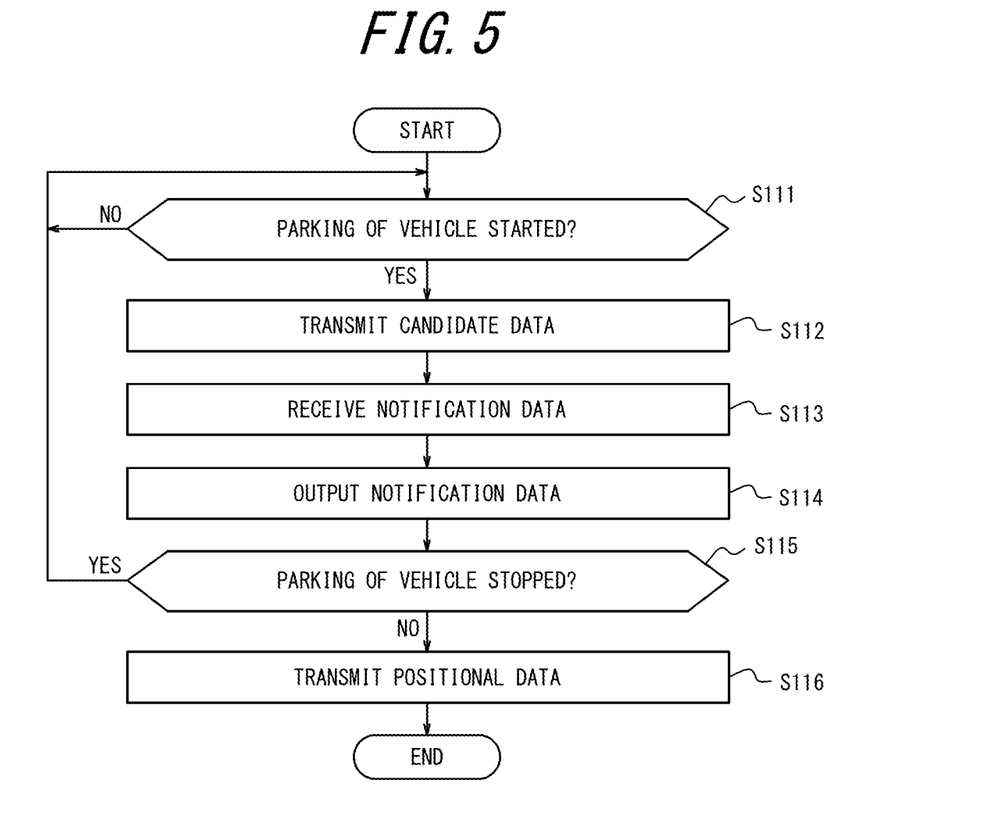
FIG. 5 is a flowchart illustrating operations of the terminal apparatus according to the embodiment of the present disclosure.

Operations of the system 10 according to the present embodiment will be described with reference to FIGS. 4 and 5. These operations correspond to a discount determination method according to the present embodiment. FIG. 4 illustrates operations of the control apparatus 20. FIG. 5 illustrates operations of the terminal apparatus 30.

In step S111 of FIG. 5, the controller 31 of the terminal apparatus 30 determines whether a user such as a driver of the vehicle 11 has started parking the vehicle 11. In a case in which the user has started parking the vehicle 11, the process in step S112 is performed. In a case in which the user has not started parking the vehicle 11, the process in step S111 is performed again.

The start of parking may be determined in any procedure, but in the present embodiment, is determined in the following procedure.

The positioner 36 of the terminal apparatus 30 measures the position of the terminal apparatus 30. The controller 31 of the terminal apparatus 30 determines, with reference to a result of measuring the position by the positioner 36, whether the user has started parking the vehicle 11. Specifically, the controller 31 determines that the user has started parking the vehicle 11 in a case in which condition C1 with respect to the position of the terminal apparatus 30 is satisfied. Condition C1 is, for example, a condition that the position of the terminal apparatus 30 does not change for a certain time period, a condition that the position of the terminal apparatus 30 matches a known parking space, or a combination thereof.

The start of parking may be determined according to the state of the vehicle 11 instead of the position of the terminal apparatus 30 or together with the position of the terminal apparatus 30. In such a variation, the controller 31 of the terminal apparatus 30 acquires data indicating the state of the vehicle 11 via a CAN of the vehicle 11. The term "CAN" is an abbreviation of Controller Area Network. The data indicating the state of the vehicle 11 includes, for example, data indicating the speed of the vehicle 11, or if the vehicle 11 is an AT vehicle, data indicating the gear position. The term "AT" is an abbreviation of automatic transmission. The controller 31 determines, with reference to the acquired data, whether the user has started parking the vehicle 11. Specifically, the controller 31 determines that the user has started parking the vehicle 11 in a case in which condition C2 with respect to the state of the vehicle 11 is satisfied. Condition C2 is, for example, a condition that the speed of the vehicle 11 is "0" for a certain time period, a condition that the gear position is "P", or a combination thereof.

The start of parking may be determined according to a user operation instead of the position of the terminal apparatus 30 or together with the position of the terminal apparatus 30. In such a variation, the controller 31 of the terminal apparatus 30 determines that the user has started parking the vehicle 11 in a case in which an operation, such as the user pressing a "start parking" button, is accepted by the input interface 44 such as a touch screen.

In step S112 of FIG. 5, the controller 31 of the terminal apparatus 30 controls the communication interface 33 to transmit candidate data D1. The candidate data D1 is data indicating a candidate parking position of the vehicle 11. The communication interface 33 transmits the candidate data D1 to the control apparatus 20. Specifically, the communication interface 33 transmits, to the control apparatus 20, the result of measuring the position by the positioner 36 obtained in step S111 as the candidate data D1.

In a case in which the start of parking is determined according to the state of the vehicle 11 or a user operation instead of the position of the terminal apparatus 30 in step S111, a result of measuring the position by the positioner 36 is obtained in step S112. Then, the communication interface 33 transmits, to the control apparatus 20, the result of measuring the position by the positioner 36 obtained in step S112 as the candidate data D1.

In step S101 of FIG. 4, the communication interface 23 of the control apparatus 20 receives, from the terminal apparatus 30, the candidate data D1 transmitted in step S112 of FIG. 5. The controller 21 of the control apparatus 20 acquires the candidate data D1 received by the communication interface 23.

In step S102 of FIG. 4, the controller 21 of the control apparatus 20 generates notification data D2. The notification data D2 is data notifying the user whether a discount is to be applied to a usage fee for the vehicle 11 if the vehicle 11 is parked at the position that is indicated by the candidate data D1 acquired in step S101. The controller 21 controls the communication interface 23 to transmit the generated notification data D2. The communication interface 23 transmits the notification data D2 to the terminal apparatus 30.

The notification data D2 may be generated in any procedure, but in the present embodiment, is generated in the following procedure.

The controller 21 of the control apparatus 20 refers to designation data D3. The designation data D3 is data designating a parking space with respect to which a discount is to be applied to the usage fee for the vehicle 11 among a plurality of parking spaces that is in a parking lot, on a road, or the like. The designation data D3 is stored in advance in the memory 22 of the control apparatus 20 or in external storage. The controller 21 determines whether the position indicated by the candidate data D1 matches the parking space designated by the designation data D3. In a case in which the position indicated by the candidate data D1 matches the parking space designated by the designation data D3, the controller 21 generates, as the notification data D2, data notifying the user that the discount is to be applied. In a case in which the position indicated by the candidate data D1 does not match the parking space designated by the designation data D3, the controller 21 generates, as the notification data D2, data notifying the user that the discount is not to be applied.

In step S113 of FIG. 5, the communication interface 33 of the terminal apparatus 30 receives, from the control apparatus 20, the notification data D2 transmitted in step S102 of FIG. 4. The controller 31 of the terminal apparatus 30 acquires the notification data D2 received by the communication interface 33.

In step S114 of FIG. 5, the controller 31 of the terminal apparatus 30 controls the output interface 35 to output the notification data D2 acquired in step S113. The output interface 35 outputs the notification data D2 as a notification message such as "if you park the vehicle in that space, you will receive a discount on the car sharing fee" or "if you do not park the vehicle in a more prominent space, you will not receive a discount on the car sharing fee". Specifically, a display serving as the output interface 35 displays such a notification message on a screen. Alternatively, a speaker serving as the output interface 35 outputs such a notification message as audio.

In step S115 of FIG. 5, the controller 31 of the terminal apparatus 30 determines whether the user has stopped parking the vehicle 11. In a case in which the user has not stopped parking the vehicle 11, the process in step S116 is performed. In a case in which the user has stopped parking the vehicle 11, the processes in step S111 onwards are performed again.

The stop of parking may be determined in any procedure, but in the present embodiment, is determined in the following procedure.

The positioner 36 of the terminal apparatus 30 measures the position of the terminal apparatus 30. The controller 31 of the terminal apparatus 30 determines, with reference to a result of measuring the position by the positioner 36, whether the user has stopped parking the vehicle 11. Specifically, the controller 31 determines that the user has stopped parking the vehicle 11 in a case in which condition C3 with respect to the position of the terminal apparatus 30 is satisfied. Condition C3 is, for example, a condition that the position of the terminal apparatus 30 has changed, a condition that the position of the terminal apparatus 30 no longer matches a known parking space, or a combination thereof.

The stop of parking may be determined according to the state of the vehicle 11 instead of the position of the terminal apparatus 30 or together with the position of the terminal apparatus 30. In such a variation, the controller 31 of the terminal apparatus 30 acquires data indicating the state of the vehicle 11 via a CAN of the vehicle 11. The controller 31 determines, with reference to the acquired data, whether the user has stopped parking the vehicle 11. Specifically, the controller 31 determines that the user has stopped parking the vehicle 11 in a case in which condition C4 with respect to the state of the vehicle 11 is satisfied. Condition C4 is, for example, a condition that the speed of the vehicle 11 has exceeded "0", a condition that the gear position has been shifted to "D", or a combination thereof.

The stop of parking may be determined according to a user operation instead of the position of the terminal apparatus 30 or together with the position of the terminal apparatus 30. In such a variation, the controller 31 of the terminal apparatus 30 determines that the user has stopped parking the vehicle 11 in a case in which an operation, such as the user pressing a "stop parking" button, is accepted by the input interface 44 such as a touch screen.

In step S116 of FIG. 5, the controller 31 of the terminal apparatus 30 controls the communication interface 33 to transmit positional data D4. The positional data D4 is data indicating the position of the vehicle 11. In the present embodiment, the positional data D4 is data indicating, as the position of the vehicle 11, a parking position of the vehicle 11. The communication interface 33 transmits the positional data D4 to the control apparatus 20. Specifically, the communication interface 33 transmits, to the control apparatus 20, the result of measuring the position by the positioner 36 obtained in step S115 as the positional data D4.

In a case in which the stop of parking is determined according to the state of the vehicle 11 or a user operation instead of the position of the terminal apparatus 30 in step S115, a result of measuring the position by the positioner 36 is obtained in step S116. Then, the communication interface 33 transmits, to the control apparatus 20, the result of measuring the position by the positioner 36 obtained in step S116 as the positional data D4.

In step S103 of FIG. 4, the communication interface 23 of the control apparatus 20 receives, from the terminal apparatus 30, the positional data D4 transmitted in step S116 of FIG. 5. The controller 21 of the control apparatus 20 acquires the positional data D4 received by the communication interface 23.

In step S104 of FIG. 4, the controller 21 of the control apparatus 20 identifies the position of the vehicle 11 with reference to the positional data D4 acquired in step S103. In the present embodiment, the controller 21 identifies, as the position of the vehicle 11, the parking position of the vehicle 11. The controller 21 determines, with reference to the designation data D3, whether the parking position matches the parking space designated by the designation data D3. In a case in which the parking position matches the parking space designated by the designation data D3, the controller 21 determines to apply a discount to the usage fee for the vehicle 11. Then, the process in step S105 is performed. In a case in which the parking position does not match the parking space designated by the designation data D3, the process in step S107 is performed.

In step S105 of FIG. 4, the controller 21 of the control apparatus 20 calculates a count of people who have seen an advertisement 12 presented by the vehicle 11 at the position identified in step S104.

The count of people who have seen the advertisement 12 may be calculated in any procedure, but in the present embodiment, is calculated in the following procedure.

The controller 31 of the terminal apparatus 30 repeatedly or continuously acquires images of the outside of the vehicle 11 that are captured by a camera serving as the input interface 34 or by a camera mounted in the vehicle 11 while the vehicle 11 continues to be parked. The controller 31 controls the communication interface 33 to transmit the acquired images of the outside of the vehicle 11. The communication interface 33 transmits the images of the outside of the vehicle 11 to the control apparatus 20.

The communication interface 23 of the control apparatus 20 receives the images of the outside of the vehicle 11 from the terminal apparatus 30. The controller 21 of the control apparatus 20 acquires the images of the outside of the vehicle 11 received by the communication interface 23. The controller 21 analyzes the acquired images of the outside of the vehicle 11 to detect glances from people around the parking position. As the image processing method for detecting glances, a known method can be used. Machine learning may be used. The controller 21 calculates the count of people who have seen the advertisement 12 based on obtained detection results. Specifically, the controller 21 determines, for each person around the parking position who is in the images of the outside of the vehicle 11, whether a corresponding detected glance has been directed at the advertisement 12. The controller 21 counts, among people who are in the images of the outside of the vehicle 11, the number of people who have directed glances at the advertisement 12 at least once as the count of people who have seen the advertisement 12.

In step S106 of FIG. 4, the controller 21 of the control apparatus 20 determines an amount of a discount to be applied to the usage fee for the vehicle 11 according to the calculation result of step S105. That is, the controller 21 determines an amount of the discount according to the count of people who have seen the advertisement 12 at the position identified in step S104. Specifically, the controller 21 refers to a conversion table stored in advance in the memory 22 or uses a predefined conversion formula to derive an amount of the discount corresponding to the count of people who have seen the advertisement 12.

In step S107 of FIG. 4, the controller 21 of the control apparatus 20 determines whether the user has completed use of the vehicle 11. In a case in which the user has completed use of the vehicle 11, the process in step S108 is performed. In a case in which the user has not completed use of the vehicle 11, the process in step S107 is performed again.

The completion of use may be determined in any procedure, but in the present embodiment, is determined in the following procedure.

The positioner 36 of the terminal apparatus 30 repeatedly measures the position of the terminal apparatus 30 while the vehicle 11 continues to be used. The controller 31 of the terminal apparatus 30 controls the communication interface 33 to transmit a result of measuring the position by the positioner 36. The communication interface 33 transmits, to the control apparatus 20, the result of measuring the position by the positioner 36 as positional data D5. The positional data D5 is data indicating the position of the vehicle 11.

The communication interface 23 of the control apparatus 20 receives the positional data D5 from the terminal apparatus 30. The controller 21 of the control apparatus 20 acquires the positional data D5 received by the communication interface 23. The controller 21 determines, with reference to the acquired positional data D5, whether the user has completed use of the vehicle 11. Specifically, the controller 21 determines that the user has completed use of the vehicle 11 in a case in which condition C5 with respect to the position of the vehicle 11 is satisfied. Condition C5 is, for example, a condition that the position of the vehicle 11 matches the final destination or a place to return the vehicle 11.

The completion of use may be determined according to a user operation instead of the position of the vehicle 11 or together with the position of the vehicle 11. In such a variation, the controller 31 of the terminal apparatus 30 controls the communication interface 33 to transmit notification of the completion of use in a case in which an operation, such as the user pressing a "complete use" button, is accepted by the input interface 44 such as a touch screen. The controller 21 of the control apparatus 20 determines that the user has completed use of the vehicle 11 in a case in which the notification of the completion of use transmitted from the terminal apparatus 30 is received by the communication interface 23.

In step S108 of FIG. 4, the controller 21 of the control apparatus 20 executes payment processing of the usage fee for the vehicle 11. The controller 21, in a case of having determined to apply a discount in step S104, executes payment processing of the usage fee with an amount to which the discount is applied. Specifically, the controller 21 executes payment processing of the usage fee with an amount from which the amount determined in step S106 is subtracted. The controller 21, in a case of having not determined to apply a discount in step S104, executes payment processing of the usage fee with an amount without a discount. As the payment processing method, any method can be used. For example, a method can be used in which the amount of the usage fee is charged to a credit card or a bank account registered in advance in association with the user. Alternatively, a method can be used in which information regarding the amount of the usage fee and a credit card or a debit card of the user is received via the terminal apparatus 30, or a dedicated terminal mounted or installed in the vehicle 11, and the amount of the usage fee is charged to a corresponding credit card or bank account.

As described above, in the present embodiment, the controller 21 of the control apparatus 20 identifies the position of the vehicle 11 presenting an advertisement 12 to the outside of the vehicle 11. The controller 21 determines whether to apply a discount to a usage fee for the vehicle 11 according to the identified position.

According to the present embodiment, an incentive can be provided to a user according to the position of the vehicle 11, which serves as an advertising medium.

In the present embodiment, the controller 21 of the control apparatus 20 identifies, as the position of the vehicle 11, a parking position of the vehicle 11.

According to the present embodiment, in a case in which the vehicle 11 is parked at a position where the advertisement 12 can be easily seen by people, an incentive in the form of a discount on the usage fee for the vehicle 11 can be provided to the user, thereby increasing the motivation of the user to park the vehicle 11 at such a position. As a result, it is expected that the advertisement 12 can be more easily seen by people and may be more effective in promotion.

In the present embodiment, the communication interface 33 of the terminal apparatus 30 transmits candidate data D1 indicating a candidate parking position of the vehicle 11 to the control apparatus 20. The communication interface 23 of the control apparatus 20 receives the candidate data D1. The controller 21 of the control apparatus 20 controls the communication interface 23 to transmit notification data D2 notifying the user whether the discount is to be applied if the vehicle 11 is parked at the position indicated by the candidate data D1 received by the communication interface 23. The communication interface 33 of the terminal apparatus 30 receives the notification data D2 from the control apparatus 20. The output interface 35 of the terminal apparatus 30 outputs the notification data D2 received by the communication interface 33.

According to the present embodiment, the user can know at which position the vehicle 11 should be parked to receive an incentive.

As a variation of the present embodiment, the processes in step S111 to step S115 of FIG. 5 may be omitted. In this variation, the processes in step S101 and step S102 of FIG. 4 are also omitted.

As a variation of the present embodiment, the candidate data D1 may be data, instead of indicating an actual parking position of the vehicle 11 as a candidate parking position, indicating a candidate parking position selected by the user before the vehicle 11 is actually parked. In such a variation, the process in step S111 of FIG. 5 is omitted. In step S112, the controller 31 of the terminal apparatus 30 accepts an operation, such as the user selecting a candidate from a candidate list of parking positions or a candidate group of parking positions on a map, with the input interface 44 such as a touch screen. The communication interface 33 of the terminal apparatus 30 transmits, to the control apparatus 20, data indicating the selected candidate as the candidate data D1. In step S115, the controller 31 determines whether the user has parked the vehicle 11 at the position indicated by the candidate data D1, instead of determining whether the user has stopped parking the vehicle 11. In a case in which the user has parked the vehicle 11 at the position indicated by the candidate data D1, the process in step S116 is performed.

As a variation of the present embodiment, an amount of a discount to be applied to the usage fee for the vehicle 11 may be determined according to the visibility of the vehicle 11 at the parking position instead of a count of people who have seen the advertisement 12 at the parking position. Operations of the control apparatus 20 according to a first variation, such a variation, will be described with reference to FIG. 6.

Figure 6:
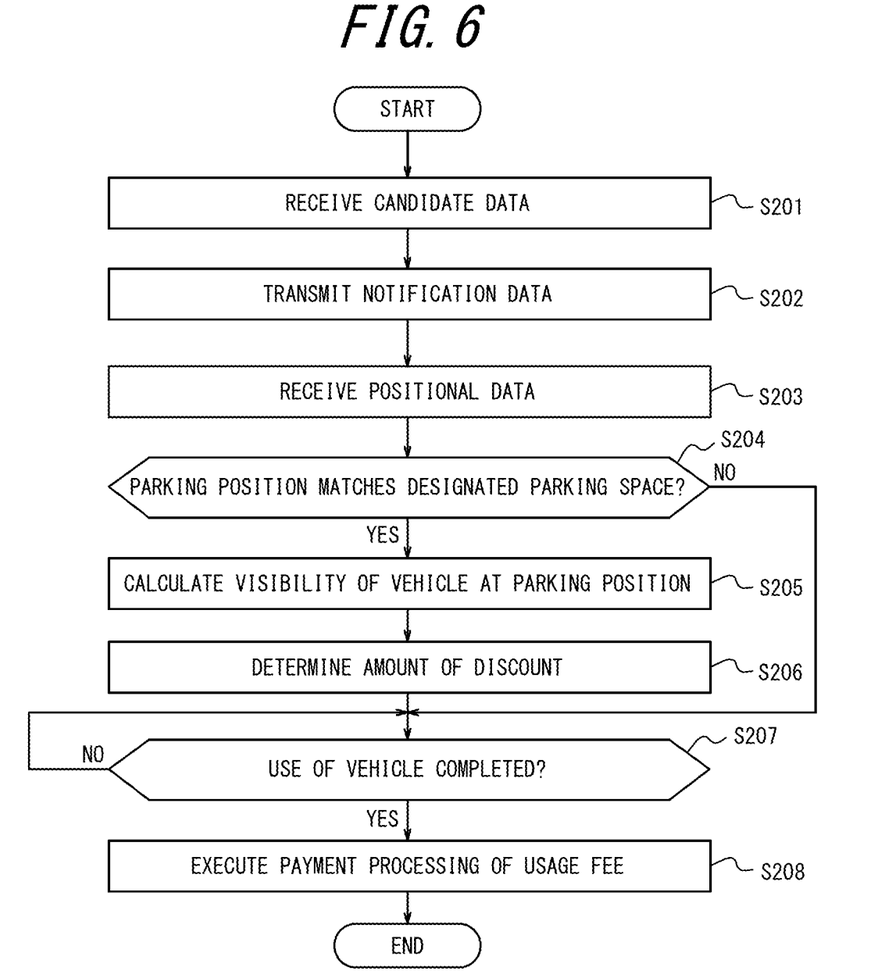
FIG. 6 is a flowchart illustrating operations of the control apparatus according to a first variation of the embodiment of the present disclosure.

The processes in step S201 to step S204 of FIG. 6 are the same as the processes in step S101 to step S104 of FIG. 4, and thus descriptions thereof are omitted.

In step S205 of FIG. 6, the controller 21 of the control apparatus 20 calculates the visibility of the vehicle 11 at the position identified in step S204.

The visibility may be calculated in any procedure, but in this variation, is calculated in the following procedure.

The controller 31 of the terminal apparatus 30 acquires at least once an image of the outside of the vehicle 11 that is captured by a camera serving as the input interface 34 or by a camera mounted in the vehicle 11. The controller 31 controls the communication interface 33 to transmit the acquired image of the outside of the vehicle 11. The communication interface 33 transmits the image of the outside of the vehicle 11 to the control apparatus 20.

The communication interface 23 of the control apparatus 20 receives the image of the outside of the vehicle 11 from the terminal apparatus 30. The controller 21 of the control apparatus 20 acquires the image of the outside of the vehicle 11 received by the communication interface 23. The controller 21 analyzes the acquired image of the outside of the vehicle 11 to observe the environment around the parking position. As the image processing method for observing the environment, a known method can be used. Machine learning may be used. The controller 21 calculates the visibility based on an obtained observation result. Specifically, the controller 21 identifies, for each shielding object around the parking position that is in the image of the outside of the vehicle 11, the positional relationship with the vehicle 11 to evaluate the degree to which the vehicle 11 or at least the advertisement 12 is visible from people around the parking position as the visibility.

In step S206 of FIG. 6, the controller 21 of the control apparatus 20 determines an amount of a discount to be applied to the usage fee for the vehicle 11 according to the calculation result of step S205. That is, the controller 21 determines an amount of the discount according to the visibility of the vehicle 11 at the position identified in step S204. Specifically, the controller 21 refers to a conversion table stored in advance in the memory 22 or uses a predefined conversion formula to derive an amount of the discount corresponding to the visibility.

The processes in step S207 and step S208 of FIG. 6 are the same as the processes in step S107 and step S108 of FIG. 4, and thus descriptions thereof are omitted.

In the first variation, the visibility of the vehicle 11 at the parking position of the vehicle 11 is calculated based on the observation result obtained by observing the environment around the parking position; however, the visibility may be calculated based on search results obtained by searching for shielding objects around the parking position. In such a variation, in step S205 of FIG. 6, the controller 21 of the control apparatus 20 searches for shielding objects around the position identified in step S204 with reference to map data D7. The map data D7 may be stored in advance in the memory 22 of the control apparatus 20, or may be accumulated in an external system such as an Internet-based GIS. The term "GIS" is an abbreviation of geographic information system. The controller 21 calculates the visibility based on obtained search results. Specifically, the controller 21 identifies, for each retrieved shielding object, the positional relationship with the vehicle 11 to evaluate the degree to which the vehicle 11 or at least the advertisement 12 is visible from people around the parking position as the visibility.

As a variation of the present embodiment, an amount of a discount to be applied to the usage fee for the vehicle 11 may be determined according to the flow of people around the parking position instead of a count of people who have seen the advertisement 12 at the parking position. Operations of the control apparatus 20 according to a second variation, such a variation, will be described with reference to FIG. 7.

Figure 7:
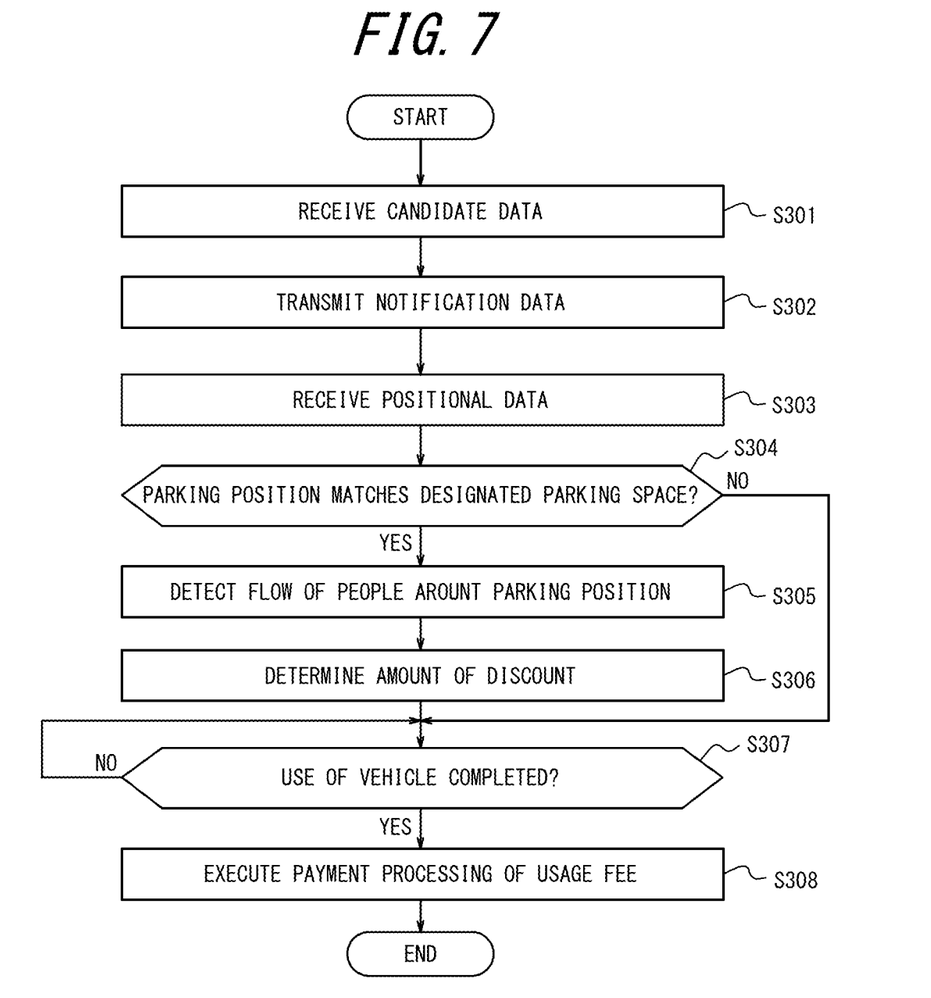
FIG. 7 is a flowchart illustrating operations of the control apparatus according to a second variation of the embodiment of the present disclosure.

The processes in step S301 to step S304 of FIG. 7 are the same as the processes in step S101 to step S104 of FIG. 4, and thus descriptions thereof are omitted.

In step S305 of FIG. 7, the controller 21 of the control apparatus 20 detects the flow of people around the position identified in step S304.

The flow of people may be detected in any procedure, but in this variation, is detected in the following procedure.

The controller 31 of the terminal apparatus 30 acquires at least once an image of the outside of the vehicle 11 that is captured by a camera serving as the input interface 34 or by a camera mounted in the vehicle 11. The controller 31 controls the communication interface 33 to transmit the acquired image of the outside of the vehicle 11. The communication interface 33 transmits the image of the outside of the vehicle 11 to the control apparatus 20.

The communication interface 23 of the control apparatus 20 receives the image of the outside of the vehicle 11 from the terminal apparatus 30. The controller 21 of the control apparatus 20 acquires the image of the outside of the vehicle 11 received by the communication interface 23. The controller 21 analyzes the acquired image of the outside of the vehicle 11 to observe the environment around the parking position. As the image processing method for observing the environment, a known method can be used. Machine learning may be used. The controller 21 detects the flow of people around the parking position based on an obtained observation result. Specifically, the controller 21 counts the number of people around the parking position who are in the image of the outside of the vehicle 11 as the flow of people.

In step S306 of FIG. 7, the controller 21 of the control apparatus 20 determines an amount of a discount to be applied to the usage fee for the vehicle 11 according to the detection result of step S305. That is, the controller 21 determines an amount of the discount according to the flow of people around the position identified in step S304. Specifically, the controller 21 refers to a conversion table stored in advance in the memory 22 or uses a predefined conversion formula to derive an amount of the discount corresponding to the flow of people.

The processes in step S307 and step S308 of FIG. 7 are the same as the processes in step S107 and step S108 of FIG. 4, and thus descriptions thereof are omitted.

In the second variation, the flow of people around the parking position of the vehicle 11 is detected based on the observation result obtained by observing the environment around the parking position; however, the flow of people may be detected based on human flow data D8 provided by a mobile communication carrier. In such a variation, in step S305 of FIG. 7, the controller 21 of the control apparatus 20 detects the flow of people around the position identified in step S304 with reference to the human flow data D8.

As a variation of the present embodiment, it may be determined whether to apply a discount to the usage fee for the vehicle 11 according to a stopping position or a traveling position, such as a traveling lane, of the vehicle 11 instead of a parking position of the vehicle 11. In such a variation, the processes in step S111 to step S115 of FIG. 5 are omitted. The processes in step S101 and step S102 of FIG. 4 are also omitted. The designation data D3 is data designating a position on a road, such as an intersection or a lane, with respect to which a discount is to be applied to the usage fee for the vehicle 11. In step S104, the controller 21 of the control apparatus 20 identifies, as the position of the vehicle 11, a stopping position or a traveling position of the vehicle 11. The controller 21 determines, with reference to the designation data D3, whether the stopping position or the traveling position matches the position designated by the designation data D3. In a case in which the stopping position or the traveling position matches the position designated by the designation data D3, the controller 21 determines to apply a discount to the usage fee for the vehicle 11. Then, the process in step S105 is performed. In a case in which the stopping position or the traveling position does not match the position designated by the designation data D3, the process in step S107 is performed.

The present disclosure is not limited to the embodiment described above. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

For example, the control apparatus 20 may be mounted or installed in the vehicle 11. In that case, at least some of the operations of the terminal apparatus 30 may be performed by the control apparatus 20. The terminal apparatus 30 may be integrated with the control apparatus 20. The control apparatus 20 may be, for example, an in-vehicle device such as a car navigation device, a mobile device such as a mobile phone, a smartphone, or a tablet, or a PC.

The invention claimed is:

1. A system comprising:
a terminal apparatus mounted or installed in a vehicle; and
a control apparatus comprising:
    a communication interface configured to receive positional data indicating a position of the vehicle presenting an advertisement to outside of the vehicle, and an image of the outside of the vehicle captured at the vehicle, from the terminal apparatus; and
    a controller configured to:
        identify the position of the vehicle with reference to the positional data received by the communication interface;
        determine whether to apply a discount to a usage fee for the vehicle according to the identified position;
        upon determining to apply the discount, analyze the image of the outside of the vehicle received by the communication interface to detect glances directed at the advertisement from people around the identified position and obtain detection results;
        calculate a count of people who have seen the advertisement at the identified position based on the obtained detection results; and
        determine an amount of the discount according to the calculated count, wherein:
the controller is configured to identify, as the position of the vehicle, a parking position of the vehicle;
the terminal apparatus is configured to transmit candidate data indicating a candidate parking position of the vehicle to the control apparatus;
the communication interface is configured to receive the candidate data;
the controller is configured to control the communication interface to transmit notification data notifying a user of whether the discount is to be applied if the vehicle is parked at the position that is indicated by the candidate data received by the communication interface; and
the terminal apparatus is configured to receive the notification data from the control apparatus, and output the notification data.

2. The system according to claim 1, wherein the controller is configured to refer to designation data designating a parking space with respect to which the discount is to be applied among a plurality of parking spaces, and determine to apply the discount in a case in which the identified position matches the parking space designated by the designation data.

3. The system according to claim 2, wherein the plurality of parking spaces is in a parking lot or on a road.

4. The system according to claim 1, wherein
the advertisement is presented by being displayed on a body of the vehicle and/or a display attached to the vehicle.

5. The system according to claim 1, wherein the controller is configured to execute payment processing of the usage fee with an amount to which the discount is applied.

6. A system comprising:
a terminal apparatus mounted or installed in a vehicle; and
a control apparatus comprising:
    a communication interface configured to receive positional data indicating a position of the vehicle presenting an advertisement to outside of the vehicle, from the terminal apparatus; and
    a controller configured to:
        identify the position of the vehicle with reference to the positional data received by the communication interface;
        determine whether to apply a discount to a usage fee for the vehicle according to the identified position;
        upon determining to apply the discount, identify, for each shielding object around the identified position, a positional relationship with the vehicle to evaluate a degree to which the vehicle or at least the advertisement is visible from people around the identified position as visibility; and
        determine an amount of the discount according to the evaluated visibility, wherein:
the controller is configured to identify, as the position of the vehicle, a parking position of the vehicle;
the terminal apparatus is configured to transmit candidate data indicating a candidate parking position of the vehicle to the control apparatus;
the communication interface is configured to receive the candidate data;
the controller is configured to control the communication interface to transmit notification data notifying a user of whether the discount is to be applied if the vehicle is parked at the position that is indicated by the candidate data received by the communication interface; and
the terminal apparatus is configured to receive the notification data from the control apparatus, and output the notification data.

7. The system according to claim 6, wherein:
the communication interface is configured to further receive an image of the outside of the vehicle from the terminal apparatus; and
the controller is configured to analyze the image of the outside of the vehicle received by the communication interface to search for shielding objects around the identified position.

8. The system according to claim 6, wherein the controller is configured to search for shielding objects around the identified position with reference to map data.

* * * * *